United States Patent
Brown et al.

(10) Patent No.: US 9,582,024 B2
(45) Date of Patent: Feb. 28, 2017

(54) ACTIVE VIBRATORY PEDAL ASSEMBLY

(71) Applicants: Steven Brown, Armadale (GB);
Gerard McCafferty, Glasgow (GB);
Stephen Debon, Edinburgh (GB)

(72) Inventors: Steven Brown, Armadale (GB);
Gerard McCafferty, Glasgow (GB);
Stephen Debon, Edinburgh (GB)

(73) Assignee: CTS CORPORATION, Lisle, IL (US)

( * ) Notice: Subject to any disclaimer, the term of this patent is extended or adjusted under 35 U.S.C. 154(b) by 343 days.

(21) Appl. No.: 14/243,208

(22) Filed: Apr. 2, 2014

(65) Prior Publication Data

US 2014/0298949 A1    Oct. 9, 2014

Related U.S. Application Data

(60) Provisional application No. 61/808,720, filed on Apr. 5, 2013.

(51) Int. Cl.
| | | |
|---|---|---|
| *G05G 1/40* | (2008.04) | |
| *G05G 5/03* | (2008.04) | |
| *G05G 1/44* | (2008.04) | |

(52) U.S. Cl.
CPC ............... *G05G 1/40* (2013.01); *G05G 5/03* (2013.01); *G05G 1/44* (2013.01); *Y10T 74/20534* (2015.01)

(58) Field of Classification Search
CPC .. G05G 1/38; G05G 1/40; G05G 1/44; G05G 5/03
See application file for complete search history.

(56) References Cited

U.S. PATENT DOCUMENTS

| | | | | |
|---|---|---|---|---|
| 5,039,973 | A * | 8/1991 | Carballo | H02P 25/14 338/108 |
| 5,793,016 | A * | 8/1998 | Colling | B23K 9/32 219/132 |
| 6,326,592 | B1 * | 12/2001 | Colling | B23K 9/32 219/132 |
| 6,674,030 | B2 | 1/2004 | Chen et al. | |
| 7,926,384 | B2 | 4/2011 | Wurn | |
| 8,010,180 | B2 | 8/2011 | Quaid et al. | |
| 8,042,430 | B2 | 10/2011 | Campbell | |

(Continued)

FOREIGN PATENT DOCUMENTS

| | | |
|---|---|---|
| CN | 201859522 | 6/2011 |
| DE | 3741246 A1 * | 6/1989 |

(Continued)

OTHER PUBLICATIONS

EPO Machine translation of DE 3741246, Heintz et al., Jun. 1989.*

(Continued)

*Primary Examiner* — Vinh Luong
(74) *Attorney, Agent, or Firm* — Daniel Deneufbourg

(57) ABSTRACT

An active vibratory pedal assembly including a pedal and means integrated with the pedal for causing the vibration of the pedal which, in one embodiment, comprises a vibration generation assembly located and mounted to the underside of the pedal plate which includes an electric motor and an eccentric coupled to and rotatable relative to the motor and adapted to generate a force that causes the vibration of the pedal plate for providing an operator with a sensory signal of a vehicular condition or event such as, for example, a vehicle's excessive speed.

6 Claims, 6 Drawing Sheets

(56) References Cited

U.S. PATENT DOCUMENTS

| | | |
|---|---|---|
| 8,063,754 B2 | 11/2011 | Tanida et al. |
| 8,290,697 B2 | 10/2012 | Coughlin |
| 8,565,972 B2 | 10/2013 | Kim et al. |
| 8,581,714 B2 | 11/2013 | Yu et al. |
| 2007/0265077 A1 | 11/2007 | Tom et al. |
| 2009/0051516 A1 | 2/2009 | Abel et al. |
| 2013/0047775 A1 | 2/2013 | O'Neill et al. |
| 2013/0049942 A1 | 2/2013 | Kim et al. |
| 2013/0131907 A1 | 5/2013 | Green et al. |
| 2013/0169412 A1 | 7/2013 | Roth |

FOREIGN PATENT DOCUMENTS

| | | | |
|---|---|---|---|
| DE | 10026048 | | 12/2001 |
| DE | 102006025339 | | 12/2007 |
| DE | 202010007324 | | 12/2011 |
| DE | 102011081071 | | 2/2013 |
| DE | 102011054655 A1 | * | 4/2013 |
| DE | 102014220460 A1 | * | 4/2016 |
| DE | 102014220466 A1 | * | 4/2016 |
| DE | 102014220470 A1 | * | 4/2016 |
| EP | 2036760 A1 | * | 3/2009 |
| FR | 2828155 | | 1/2001 |
| JP | 2009-132359 | * | 6/2009 |
| WO | 2013087265 | | 6/2013 |

OTHER PUBLICATIONS

English Abstract of DE 102011054655 A1, Laurent, Apr. 2013.*
EPO Machine translation of DE 102011081071 A1, Andreas, Feb. 2013.*
EPO Machine translation of DE 10026048 A1, Brian et al., Dec. 2001.*
EPO Machine translation of JP 2009-132359, Koji, Jun. 2009.*
Stefan Bracher: "Pre-study on distracted motor reaction time to haptic, visual and acoustic stimulation", ECSE 618 Class project, McGill University, Dec. 16, 2007, Montreal, QC.
Juha Hjelm: "Haptics in cars", University of Tampere, Department of Computer Sciences Seminar "Haptic Communication and Interaction in Mobile Contexts", Fall 2008, Tampere, Pirkanmaa, Finland.
S. Birrell et al: "Vibrotactile pedals: provision of haptic feedback to support economical driving", Ergonomics, 2013, vol. 56 (No. 2) pp. 282-292, Taylor & Francis Ltd. Coventry, UK.

* cited by examiner

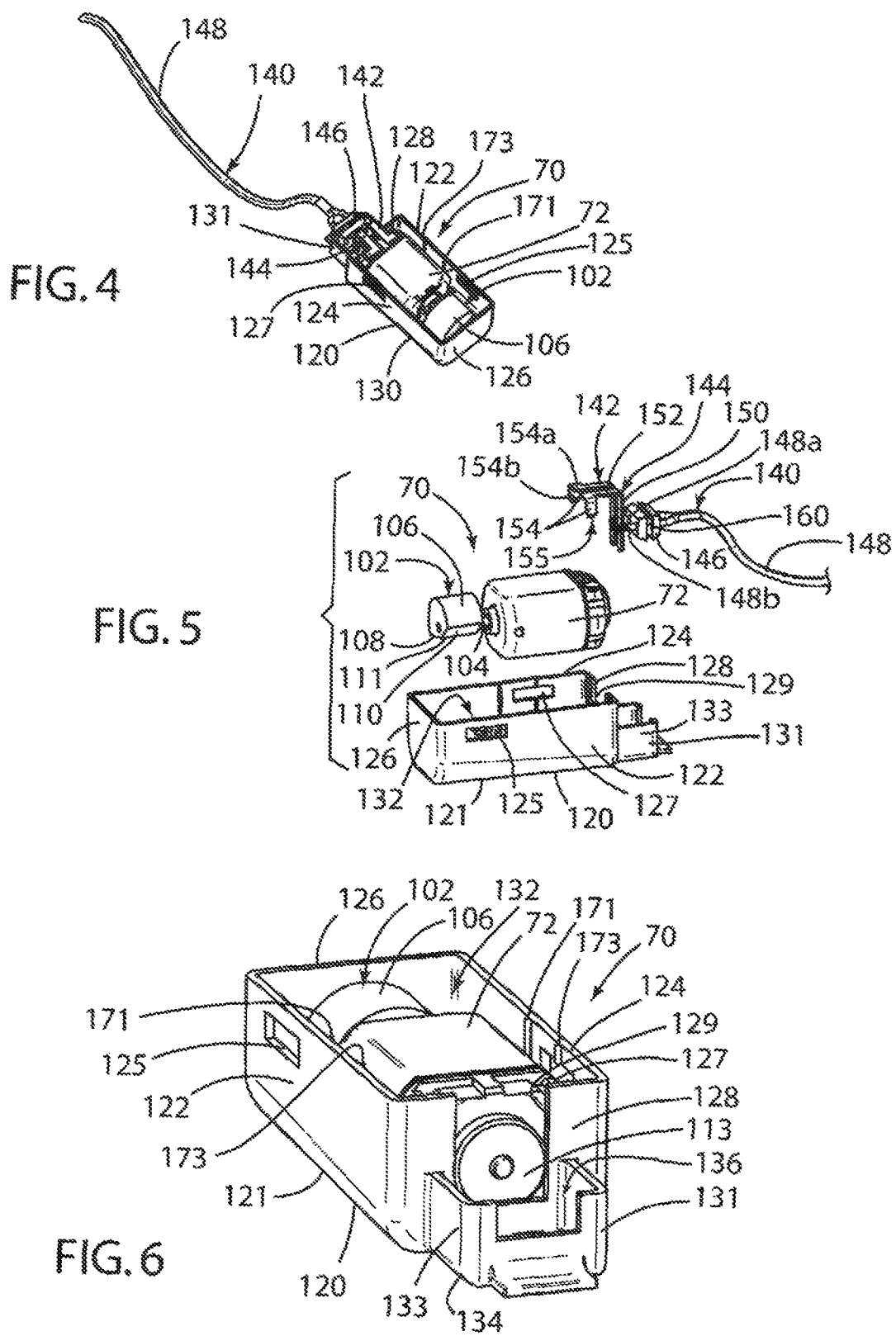

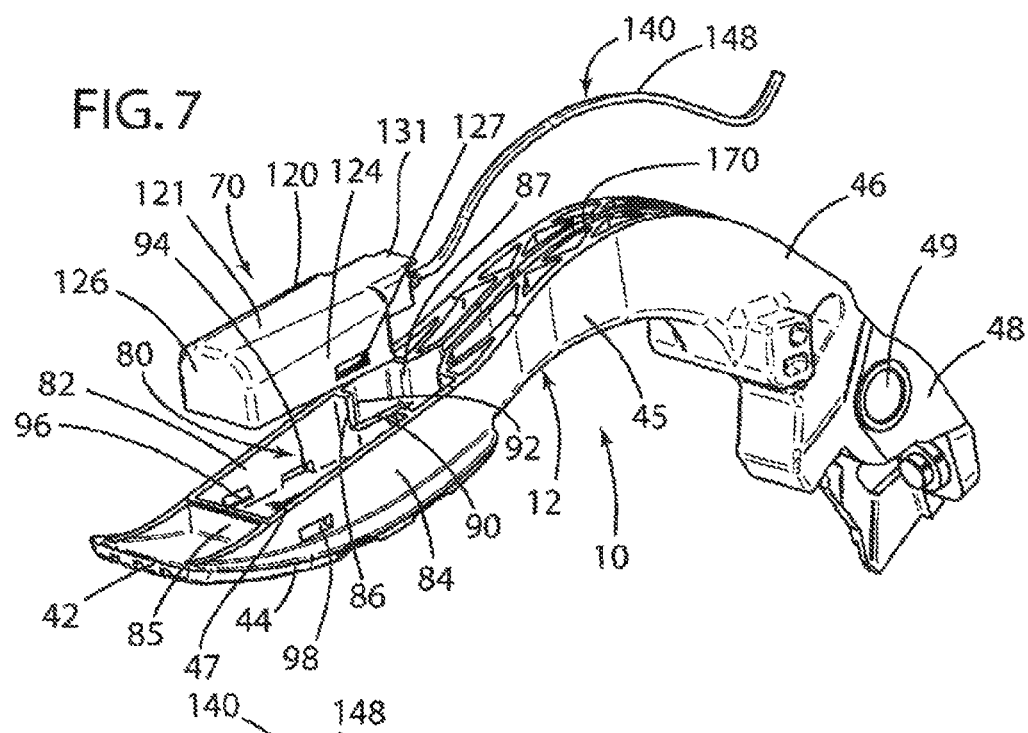
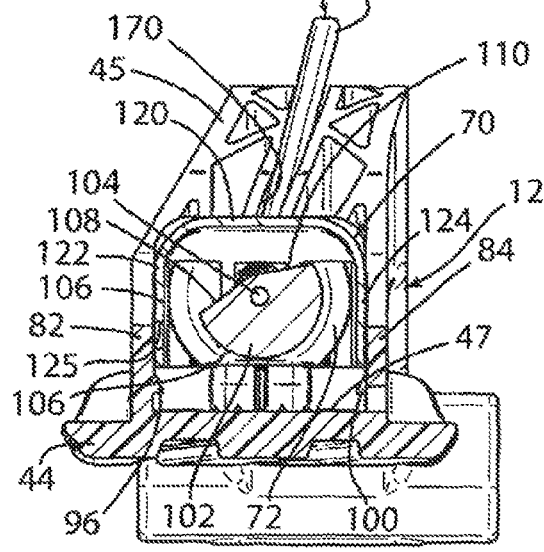
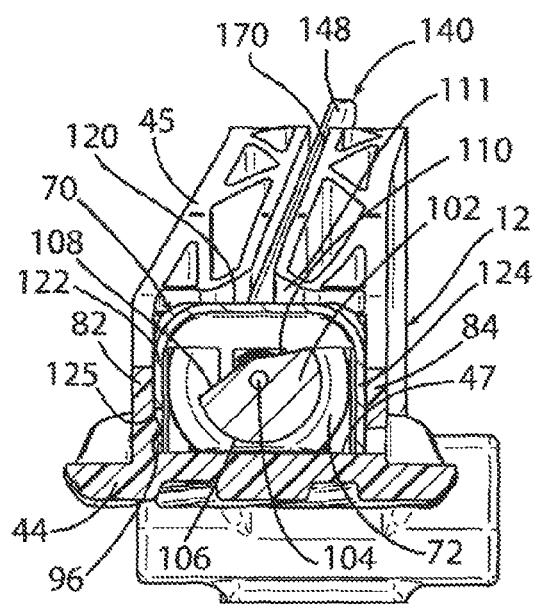

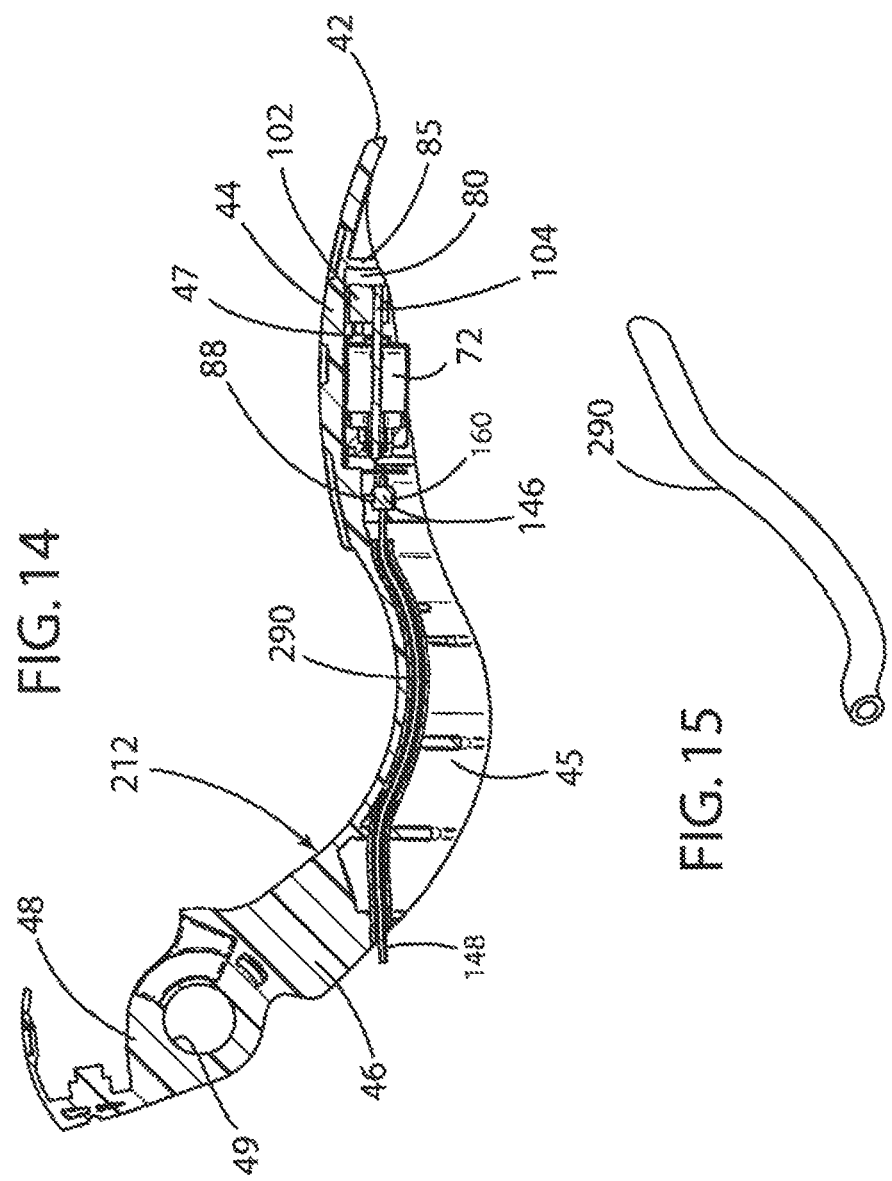

ACTIVE VIBRATORY PEDAL ASSEMBLY

CROSS REFERENCE TO RELATED AND CO-PENDING APPLICATION

This application claims the benefit of the filing date and disclosure of U.S. Provisional Patent Application Ser. No. 61/808,720 filed on Apr. 5, 2013, the contents of which are entirely incorporated herein by reference as well as all references cited therein.

FIELD OF THE INVENTION

The present invention relates to vehicle pedals in general and, in particular, to a vehicle pedal assembly incorporating an active vibratory pedal.

BACKGROUND OF THE INVENTION

Vehicle accelerator/throttle pedals allow a vehicle operator to control the acceleration of a vehicle through either the application or removal of a foot force on the pedal. Pedals have also been developed that provide haptic feedback to the operator by applying an active push back force to the pedal and the foot of the operator in response to the sensing of a variety of vehicle conditions or events including, for example, the vehicle exceeding a recommended speed, or the vehicle not keeping a safe distance behind another vehicle, or the vehicle sensing the presence of an object behind the vehicle when operating in reverse.

The present invention is directed to a new active haptic pedal subject to an active vibratory force.

SUMMARY OF THE INVENTION

The present invention is directed to an active vibratory pedal assembly comprising a pedal including a foot plate having an underside, and means located on the underside of the foot plate adapted to generate a vibratory movement of the foot plate and a sensory signal of the occurrence of a vehicular event.

In one embodiment, the means adapted to generate the vibratory movement comprises a vibration generation assembly integrated with the pedal and including a motor, and an eccentric coupled to the motor and adapted for rotation in response to the activation of the motor to generate a vibration that is transferred to the foot plate of the pedal.

In one embodiment, the motor is an electric motor.

In one embodiment, a motor power cable extends from the electric motor along the underside of the pedal.

In one embodiment, an elongate slot is defined in the underside of the pedal, the power cable extending through the elongate slot defined in the underside of the pedal.

In one embodiment, a contactor activates the motor in response to the rotation of the pedal to a set motor activation point.

The present invention is also directed to an active vibratory pedal assembly comprising a pedal including a foot plate, the pedal arm including an underside defining a cavity located under the foot plate, and a vibration generation assembly located and mounted in the cavity of the pedal arm, the vibration generation assembly including an electric motor and an eccentric coupled to the motor, the eccentric being adapted for rotation relative to the motor and generate a vibration that is transferred to the foot plate.

In one embodiment, a cover is mounted to the underside of the pedal and covers the motor and the eccentric.

In one embodiment, the pedal assembly further comprises a terminal and cable assembly including a pair of terminals, a combination terminal and cable bracket, and an elongate cable extending from the cable bracket, the pair of terminals being adapted for coupling to the motor, the combination terminal and cable bracket being mounted in the cavity of the pedal arm, and the cable extending through a slot defined in the underside of the pedal arm.

The present invention is further directed to an active vibratory pedal assembly comprising a pedal housing, a pedal including a first end extending into the pedal housing and rotatable relative to the pedal housing, the pedal including a second end including a foot plate and an underside including a plurality of walls defining a cavity under the foot plate, a vibration generation assembly mounted in the cavity under the foot plate and including an electric motor and an eccentric coupled to the motor for rotation relative to the motor and adapted to generate a vibration that is transferred to the foot plate, a motor terminal and cable assembly including a pair of terminals coupled to the motor and extending into the cavity defined in the underside of the pedal, a combination terminal and cable bracket mounted in the cavity defined in the underside of the pedal, and an elongate cable extending from the combination terminal and cable bracket into an elongate slot defined in the underside of the pedal, and a cover including a plurality of walls coupled to the plurality of walls respectively on the underside of the pedal and covering the electric motor, the eccentric, the pair of terminals, and the combination terminal and cable bracket.

In one embodiment, the combination terminal and cable bracket defines a slot and the pedal includes a partial wall located in the cavity defined in the underside of the pedal, the partial wall extending into the slot in the combination terminal and cable bracket for mounting the combination terminal and cable bracket to the pedal.

In one embodiment, the plurality of walls of the cover include an internal rib in contact with the motor and adapted to allow the transfer of the vibration generated by the eccentric to the pedal through the walls of the cover and the walls of the pedal.

In one embodiment, one of the walls of the cover or the pedal includes a tab and the other of the walls of the cover or the pedal includes an aperture, the tab extending into the aperture for snap fitting the cover to the pedal.

In one embodiment, a recess is defined in the underside of the pedal, the recess being located in the elongate slot and the cable being retained in the recess in the slot.

Other advantages and features of the present invention will be more readily apparent from the following detailed description of one embodiment of the invention, the accompanying drawings, and the appended claims.

BRIEF DESCRIPTION OF THE DRAWINGS

These and other features of the invention can best be understood by the following description of the accompanying FIGS. (or alternatively FIGURES):

FIG. 4 is a broken perspective view of the vibration generation assembly of the active vibratory pedal assembly of the present invention;

FIG. 5 is a broken, exploded perspective view of the vibration generation assembly of the active vibratory pedal assembly of the present invention;

FIG. 6 is another perspective view of the vibration generation assembly of the active vibratory pedal assembly of the present invention;

FIG. 7 is a broken, exploded bottom perspective view of the active vibratory pedal assembly shown in FIG. 1 with the vibration generation assembly shown in exploded form;

FIG. 8 is a vertical cross-sectional view depicting the snap fitting and coupling of the cover of the vibration generation assembly to the pedal of the active vibratory pedal assembly of FIG. 1;

FIG. 9 is a broken vertical cross-sectional view taken along the line 9-9 in FIG. 3 depicting the cover and the vibration generation assembly in its assembled and snap coupled relationship to the pedal arm of the active vibratory pedal assembly of FIG. 1;

FIG. 14 is a vertical cross-sectional view of another embodiment of a pedal of an active vibratory pedal assembly in accordance with the present invention; and FIG. 15 is a perspective view of the cable retention conduit of the pedal shown in FIG. 14.

DETAILED DESCRIPTION OF THE EMBODIMENTS

FIGS. (or alternatively FIGS.) 1 through 13 depict the various elements of one embodiment of a vehicle active or haptic vibratory pedal assembly 10 in accordance with the present invention.

Figure 1:
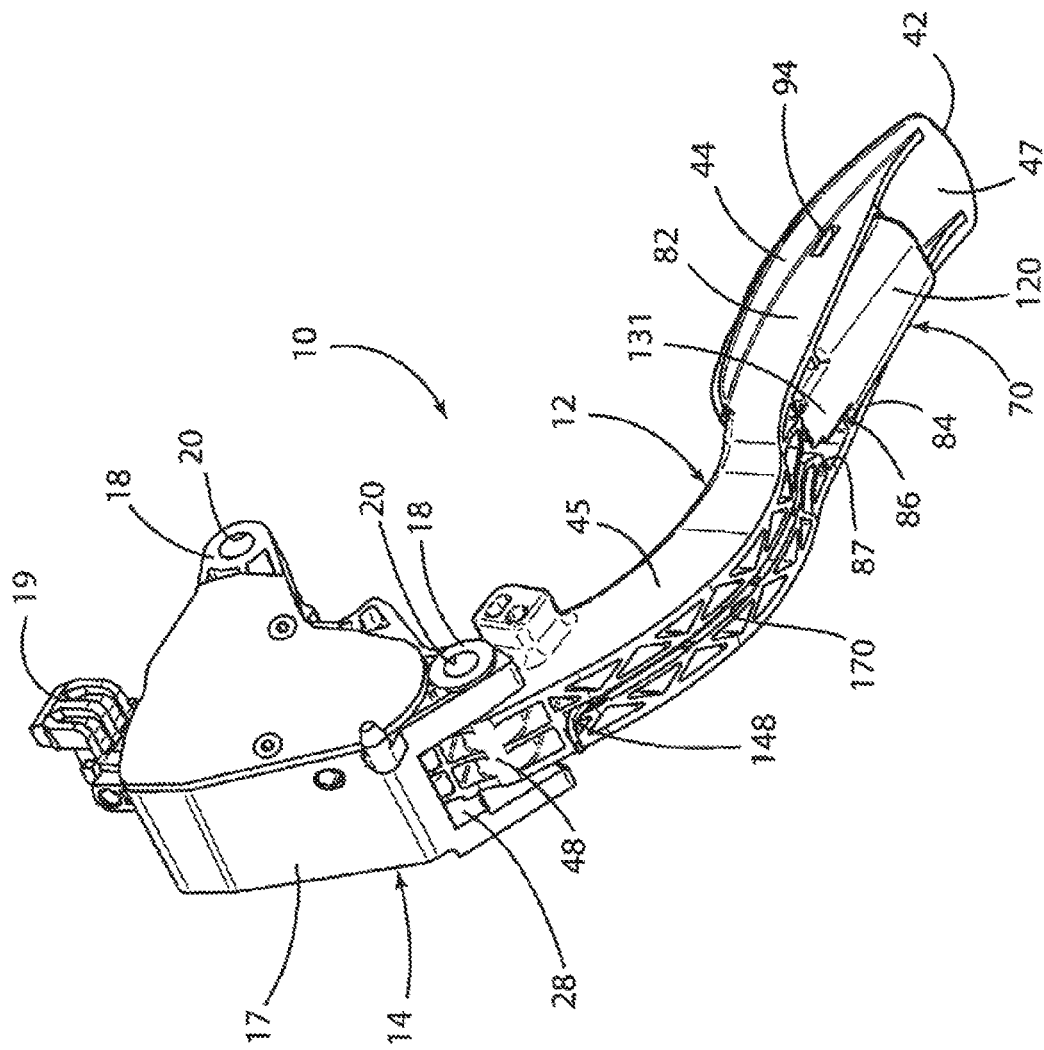
FIG. 1 is a perspective view of an active vibratory pedal assembly in accordance with the present invention.
Figure 2:
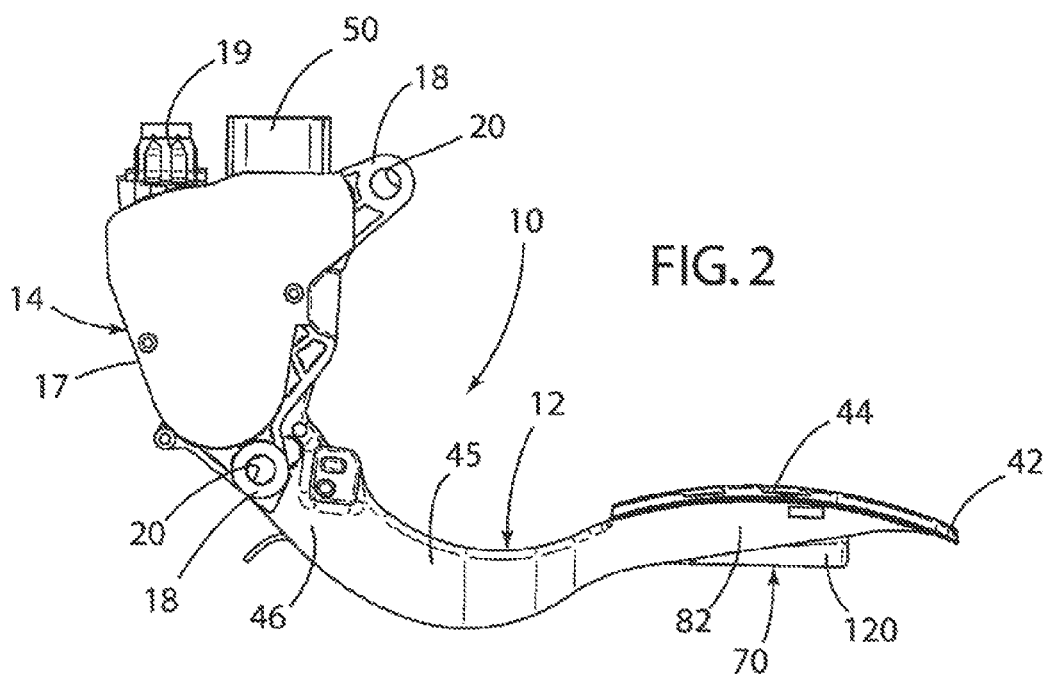
FIG. 2 is a side elevational view of the active vibratory pedal assembly shown in FIG. 1.

The vehicle pedal assembly 10 comprises a pedal 12 and a housing 14 (FIGS. 1-3) for the pedal 12 which may both be made and molded of any suitable plastic material.

In the embodiment shown, the housing 14 includes a base or plate 17 (FIG. 1), a pair of brackets 18 (FIGS. 1 and 2) defining respective apertures 20 (FIGS. 1-3) for screws, bolts, or the like (not shown), and a clip 19 (FIGS. 1-3) which together allow the securement of the housing 14 and thus the pedal assembly 10 to the wall in the foot well of a vehicle (not shown).

The housing 14 includes a plurality of walls which together with the base 17 define a front housing opening 28 (FIG. 1) for the pedal 12, a back or rear housing opening (not shown) for a connector assembly 50 (FIG. 2), and a first interior cavity (not shown) for the pedal 12.

The pedal 12 includes a proximal end 42 with a foot pad or plate 44, an elongate pedal arm 45 unitary with the foot plate 44, and a distal end 46 unitary with the pedal arm 45 and including a drum 48 (FIGS. 1 and 3) that extends through the front housing opening 28 and into the interior cavity of the housing 14.

The drum 48 is mounted in the interior cavity of the housing 14 in a relationship wherein the drum 48 is adapted for rotational movement relative to the housing 14 which thus mounts the pedal 12 to and in the housing 14 for pivoting or rotational clock-wise movement relative to the housing 14 to cause the acceleration of the vehicle and for pivoting or rotational counter-clockwise movement relative to the housing 14 to cause the deceleration of the vehicle. For example, it is understood that in one embodiment, the drum 48 defines a central through-hole 49 (FIG. 14) that terminates in respective openings in the opposed side faces of the drum 48 and that the drum 48 is adapted to receive a shaft (not shown) for mounting the drum 48, and thus the pedal 12, for pivotal or rotational movement in the interior cavity of the housing 14 relative to the base 17 and the walls of the housing 14.

Moreover, and although not described herein in any detail, it is understood that, in the embodiment shown, the assembly for sensing the position of the pedal 12 is of the non-contacting Hall effect sensor type shown and described in detail in for example U.S. Pat. No. 7,926,384 to Wurn, the description of which is incorporated herein by reference, and includes a magnet assembly with a magnet that protrudes outwardly from a front face of the drum 48 of the pedal 12 into the interior cavity of the pedal housing 14 and extends in the direction of the rear opening of the housing 14.

Thus, and although not shown or described herein in any detail, it is understood that the pedal assembly 10 comprises the combination electrical connector/sensor assembly 50 that is adapted to extend through the rear opening of the housing 14 and into the housing cavity in a relationship opposed and spaced from the magnet of the magnet assembly. The combination connector/sensor assembly 50 includes a printed circuit board (not shown) including a plurality of electrical components mounted thereon including one or more sensors such as, for example, Hall effect sensors designed to sense a change in the magnitude and/or direction of the magnetic field generated by the magnet in response to the pivotal movement of the magnet and the pedal 12 for the purpose of sensing the pivotal position of the pedal 12 and controlling the vehicle's acceleration and deceleration.

The pedal assembly 10 could also incorporate any other type of suitable assembly for sensing the position of the pedal 12 including for another example the contacting sensor type pedal position sensor assembly shown and described in for example U.S. Pat. No. 8,042,430 to Campbell, the description of which is also incorporated herein by reference.

The pedal assembly 10 further comprises a vibration generation assembly 70 (FIGS. 1-9) which is fully integrated on and with the pedal 12 and which, in the embodiment shown, comprises in part an electric motor 72 (FIGS. 4-6, 8, and 9) suitable and adapted via an eccentric 102 to create and generate a vibration force to the pedal 12 in response to the activation of the motor 72.

In the embodiment shown, the motor 72 is secured to the underside or lower surface 47 (FIGS. 7-10) of the pedal 12 and the foot plate 44 of the pedal 12 while an elongate power wire harness or cable 148 extends from the motor 72 along and through an elongate slot or slit 170 (FIGS. 1, 3, 7, 10, and 11-13) that is defined in and extends into and through the coring of the plastic material on the underside or lower surface of the pedal arm 45 of the pedal 12.

Alternatively, however and although not shown, and as for another example, the wire harness/power cable 148 could be fed back directly into the connector 50 or transferred from the pedal 12 to the housing 14 through a contactor (not shown) and then into the connector 50.

The integrated placement and securement of the motor 72 to the underside/lower surface 47 of the foot plate 44 of the pedal 12 is advantageous because it allows the vibratory force generated by the eccentric 102 to be transferred directly to the pedal 12 and more specifically directly from the lower surface 47 of the foot plate 44 to the top surface of the foot plate 44 and thus directly to the foot (not shown) of the operator of the vehicle to provide a sensory indication or signal of any one of several vehicular conditions, events, or occurrences including, for example: loss of traction due to a slide or wheel spin; to change gears for economy; to change gears when the engine is approaching or at maximum RPM; to indicate an upcoming change or kickdown into another gear; to indicate excessive speed (fixed value or linked to GPS to monitor speed limit); to indicate an unsafe distance from a vehicle or object in front of or behind a vehicle; to indicate low fuel; or to indicate engine component failure or a service requirement.

In an embodiment where the vibration generation assembly 70 is used to provide an indication of an approaching gear change or kickdown, the pedal assembly 10 could incorporate a suitable contactor attached to the pedal 12 and adapted to activate/turn-on the motor 72 in response to the rotation of the pedal 12 to a set motor activation point.

In one embodiment, the motor 72 may be an electric voltage controlled brushed or brushless DC motor of any suitable voltage that is voltage and duty cycle dependent with an eccentric 102 having as one example a mass of approximately 7.5 grams, a vibration frequency of between about 60 to 85 Hz, a haptic acceleration of about 7 G, and a haptic force of plus or minus 1.5 to 4.0 N.

Figure 10:
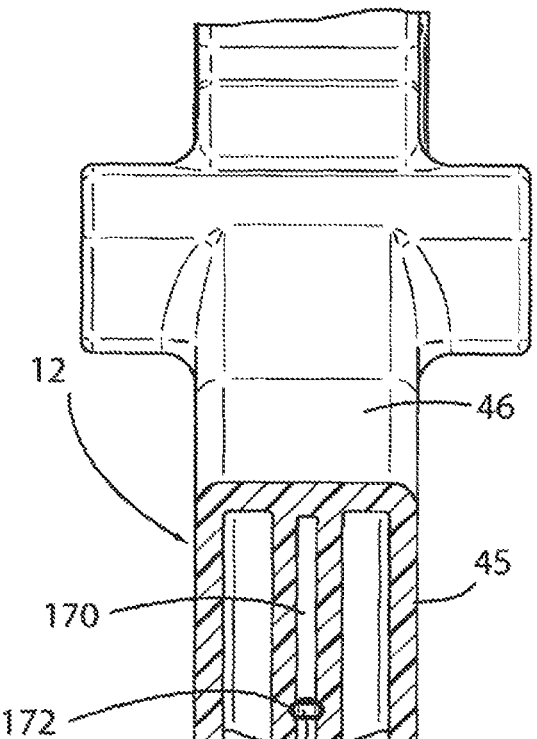
FIG. 10 is a broken, perspective view of the cavity in the underside of the pedal arm for the vibration generation assembly of the active vibratory pedal assembly of the present invention.

More specifically, and referring to for example FIGS. 7 and 10, the underside or portion 47 of the pedal 12 located under and opposite the foot plate 44 defines an interior receptacle or cavity 80 for the vibration generation assembly 70. In the embodiment shown, the cavity 80 is defined by the coring of the plastic material which forms the pedal 10 and particularly by a pair of longitudinally extending, spaced-apart, and parallel coring side walls 82 and 84 projecting generally normally outwardly from the lower surface 47 of the pedal 12 and more specifically projecting outwardly from the lower surface of the foot plate 44 and a pair of coring front and back walls 85 and 87 extending transversely between the side walls 82 and 84 and also projecting generally normally outwardly from the lower surface of the pedal 12 and more specifically projecting outwardly from the lower surface 47 of the foot plate 44.

In the embodiment shown, the pedal 12 includes a pair of additional interior coring walls 86 and 88 (FIGS. 1,3,7,10,14) that are located in the cavity 80 defined on the underside of the pedal 12 and foot plate 44 and extend between and in a direction generally transverse to the direction of the longitudinal side walls 82 and 84 and both projecting generally normally outwardly from the lower surface 47 of the pedal 12 and more specifically projecting outwardly from the lower surface 47 of the foot plate 44. The interior wall 86 defines an interior shoulder 90 and a central recess 92. The transverse interior wall 88 is a partial wall also located in the pedal cavity 80 that is oriented in a relationship spaced and generally parallel to the interior transverse wall 86 and is positioned centrally and opposite the recess 92 in the interior wall 86.

The pedal 12 further includes a further interior partial wall 94 also located in the interior pedal cavity 80 that projects outwardly from the interior surface 47 of the pedal 12 and more specifically the lower surface 47 of the foot plate 44 and extends through and in a direction transverse to the wall 86 and more specifically extends through and is located in the recess 92 defined in the interior wall 86.

In the embodiment shown, the interior walls 86, 88, and 94 are all located in the interior space defined by the interior cavity 80 of the pedal 12 between the two longitudinal side walls 82 and 84 and the front and back walls 85 and 87.

Moreover, in the embodiment shown, a pair of spaced-apart and generally parallel ribs 201 and 203 protrude outwardly from the interior or underside surface of the pedal 12 and the foot plate 44 and into the interior cavity 80. The ribs 201 and 203 extend in the same direction as the pedal longitudinal side walls 82 and 84.

Referring to FIGS. 7, 8, 9, and 10, the longitudinal side wall 82 defines a generally rectangularly shaped through-aperture 94 and a co-linearly aligned tab or snap 96 that is spaced from the through-aperture 94 and projects outwardly from the interior surface of the side wall 82 and extends into the interior cavity 80. The longitudinal side wall 84 defines a generally rectangularly shaped through-aperture 98 and a co-linearly aligned tab or snap 100 that is spaced from the through-aperture 98 and projects outwardly from the interior surface of the side wall 84 and extends into the interior cavity 80. The respective through-apertures 94 and 98 and tabs 96 and 100 are positioned relative to each other in a relationship wherein the aperture 94 in the side wall 82 is diametrically opposed to and co-linear with the tab 100 in the opposed side wall 84 and the aperture 98 in the side wall 84 is diametrically opposed to and co-linear with the tab 96 in the opposed side wall 82. In the embodiment and orientation as shown in FIG. 10, each of the tabs 96 and 100 includes an exterior camming or guide surface which slopes downwardly and outwardly from the interior surface of the respective longitudinal side walls 82 and 84. Also, in the embodiment shown, the apertures 94 and 98 allow for the formation of the tabs 96 and 100 in the mold tool during the molding of the pedal 12.

Referring to FIGS. 4, 5, and 6, the vibration generation assembly 70 comprises the electric motor 72, an eccentric or mass or weight 102, and a motor output shaft 104 that couples the eccentric 102 to the motor for rotation relative to the motor 72.

In the embodiment shown, the eccentric or mass 72 is in the form of cylinder made from a solid block or mass of a suitable material such as metal that includes three portions or surfaces: a first curvilinearly shaped exterior portion or surface 106 extending circumferentially a length approximately one hundred and eighty degrees (180°); and second and third flat exterior portions or surfaces 108 and 110 including respective first ends extending and diverging and sloping away from the respective opposite ends of the curvilinearly shaped exterior portion 106 and opposed ends that terminate into each other and a sharp elongate edge 111 (FIG. 5).

Stated another way, the eccentric 102 is in the shape and form of a solid cylinder from which an approximately one hundred and sixty degree piece or slice of material has been removed therefrom to create a cylindrical mass wherein the weight or mass thereof has been unevenly distributed and concentrated in the portion 106 so that as to cause the generation of an uneven and off-center force upon rotation of the eccentric 102 relative to the motor 70 which is in turn transferred to the pedal 12 to which the motor 70 and the eccentric 102 are coupled in the form of a vibration or shaking of the pedal 12.

In the embodiment shown, one end of the shaft 104 extends into and is coupled to the motor 72, the other end of the shaft 104 extends outwardly from the motor 72 and extends into the eccentric 102, and the motor 72, the eccentric 102, and the shaft 104 are oriented and positioned relative to each other in a relationship wherein the motor 72, the eccentric 102, and the shaft 104 all extend along and share the same longitudinal axis which longitudinal axis also forms and defines the rotational axis of the eccentric 102 and the shaft 104.

In the embodiment shown, the motor 72 includes a rear and generally circular shaped stationary abutment or securement or alignment member or neck 110.

The vehicle active vibratory pedal assembly 10 further comprises a motor assembly cover or housing 120 (FIGS. 1-9) which include a plurality of side walls 122, 124, 126, and 128 and a floor wall 121 together defining an open interior cavity 132 (FIGS. 5 and 6) adapted to receive and house the motor 72 and the eccentric 102 of the vibration generation assembly 70. The transverse side wall 128 of the motor assembly cover or housing 120 includes and defines a generally u-shaped recess or opening 129 (FIGS. 5 and 6) that is cut out of the top surface and edge of the transverse side wall 128 and extends into the body of the transverse side wall 128.

The longitudinal side walls 122 and 124 define respective generally rectangularly shaped and co-planarly aligned through-apertures 125 and 127 positioned adjacent and spaced and generally parallel to the top exterior longitudinal edge of the respective longitudinal side walls 122 and 124. The aperture 125 in the side wall 122 is positioned adjacent and spaced from the transverse side wall 126 while the aperture 127 in the side wall 124 is positioned adjacent and spaced from the transverse side wall 128.

Each of the longitudinal side walls 122 and 124 still further includes a pair of elongate, spaced apart, and generally parallel ribs 171 and 173 that protrude outwardly from the interior surface of the respective side walls 122 and 124 in an orientation and relationship generally normal to the top peripheral longitudinal edge of the respective side walls 122 and 124. In the embodiment shown, the ribs 171 and 173 extend between and in a relationship generally normal to the floor wall 121 and the top longitudinal edge of the respective side walls 122 and 124.

A terminal assembly cover or housing 131 is unitary with the motor assembly cover or housing 120 and is located and extends outwardly from the exterior surface of the side wall 128 of the motor assembly cover or housing 120 in a relationship co-linear with the recess or opening 129 defined therein. The terminal assembly cover or housing 131 includes a plurality of partial side walls 133 and a floor wall that is co-planar with the floor wall 121 of the motor assembly cover or housing 120 and together define an interior terminal receiving cavity 136 (FIG. 6).

The combination of the motor 72, the eccentric 102, and the shaft 104 are adapted to be located, mounted, and secured during the manufacturing and assembly of the pedal assembly 10 into the interior cavity 132 of the motor assembly cover or housing 120 in a relationship wherein the motor 72 is press-fitted against and wedged between the respective ribs 171 and 173 on the side walls 122 and 124 of the cover 120, the motor alignment member 110 extends into and is press or snap-fitted in the recess 129 that is defined in the side wall 128, and the eccentric 102 is located between the motor 72 and the transverse side wall 126.

In accordance with the present invention, the contact of the ribs 171 and 173 on the walls 122 and 124 of the cover 120 and the ribs 201 and 203 on the underside surface 47 of the pedal 12 with the motor 72 following the integration of the vibration generation assembly 70 in the pedal 12 advantageously aids in the transfer of the haptic vibrations from the motor 72 to the cover 120 via the ribs 171 and 173 and then to the pedal plate 44 via the plate walls 82 and 84 and also directly from the motor 72 to the pedal plate 44 via the ribs 201 and 203.

The pedal assembly 10 still further comprises a combination motor terminal and cable assembly 140 that includes a pair of power terminals 142 and 144, a combination terminal and cable bracket 146, and an elongate two wire power cable or wire harness 148 (FIGS. 4-7, and 10).

Referring to FIG. 5, each of the terminals 142 and 144 is generally L-shaped, includes respective unitary terminal portions or segments 150 and 152 oriented generally normal to each other, and respective distal terminal motor connection tabs or clips 154 unitary with and extending outwardly from the distal end of the terminal portion or segment 152 of each of the respective terminals 142. Each of the tabs or clips 154 is generally L-shaped and includes a first segment or portion 154a that extends outwardly from the exterior side face of the distal end of the respective terminal segment 152 and a second segment or portion 154b that extends downwardly from the end of the first segment or portion 154a.

The terminals 142 and 144 are attached to the combination terminal and cable bracket 146 in a spaced apart and generally parallel relationship wherein the tabs or clips 154 are diametrically opposed to each other and together define a generally U-shaped distal motor terminal clip 155.

In the embodiment shown, the terminals 142 and 144 are coupled to and extend from a first side of the combination terminal and cable bracket 146 and the cable 148 is coupled to and extends from a second opposed side of the combination terminal and cable bracket 146. The cable 148 includes a pair of cable terminal ends 148a and 148b that extend from the end of the cable 148 and through the body of the combination terminal and cable bracket 146. The terminals 142 and 144 are coupled to the respective portions of the cable terminal ends 148a and 148b that protrude outwardly from the side of the combination terminal and cable bracket 146.

Referring to FIGS. 4, 5, and 10, the combination terminal and cable bracket 146 defines a peripheral and circumferentially extending central slit or slot 160.

During and as part of the manufacturing of the pedal assembly 10, the combination motor terminal and cable assembly 140 is mounted in the motor assembly cover or housing 120 in a relationship wherein the terminal clip 155 is coupled to the exterior of the motor 72, the segments or portions 150 of the respective terminals 142 and 144 extend into the cavity 136 of the terminal housing or cover 130, and the combination terminal and cable bracket 146 is located and seated in the cavity 136 of the terminal housing or cover 130.

Moreover, during and as part of the manufacturing of the pedal assembly 10, the motor cover or housing 120 with the motor 72, the eccentric 102, and the terminal assembly 140 located therein are coupled and secured to the pedal 12 and more specifically are coupled to and secured in the interior of the cavity 80 that is defined in the pedal 12 below the foot plate 44 in the relationship and orientation as shown in for example FIGS. 1, 2, 3, 7, 8, 9, and 10.

Specifically, and as shown in FIG. 7, the motor cover or housing 120 is initially positioned in a relationship overlying the underside of the foot plate 44 and more specifically in a relationship with the motor 72 in the motor cover or housing 120 opposed and facing the cavity 80 defined in the underside of the pedal 12 and foot plate 44.

Figure 3:
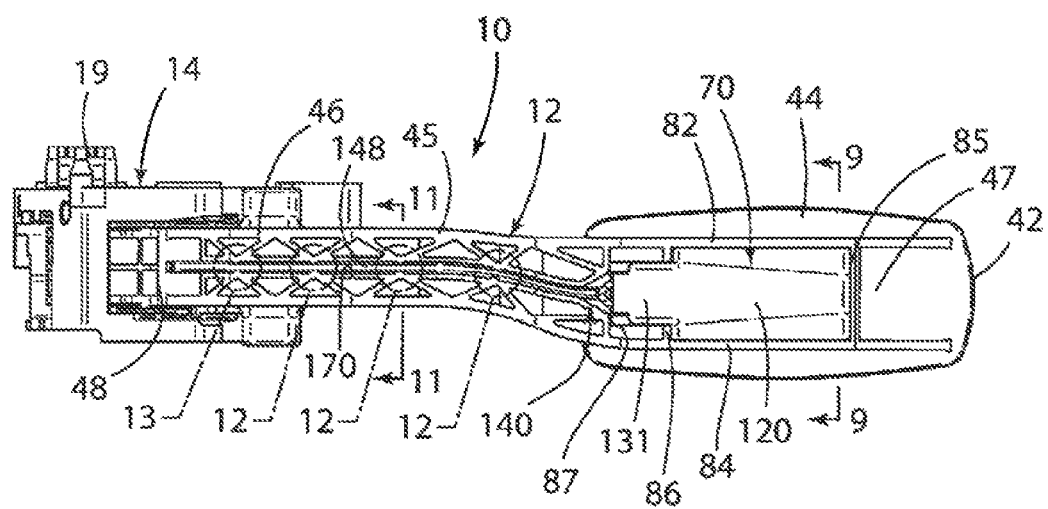
FIG. 3 is a bottom plan view of the active vibratory pedal assembly shown in FIGS. 1 and 2.

The motor cover or housing 120 is then lowered into the cavity 80 in the underside of the pedal 12 into the relationship as shown in FIG. 8 wherein the longitudinal side walls 122 and 124 of the motor cover or housing 120 are located to the inside of and between and generally parallel to the respective side walls 82 and 84 of the pedal 12 and the longitudinal side walls 133 of the terminal housing 131 extend through and are press fitted into the recess 92 defined in the transverse side wall 86 of the pedal 12 as shown in FIG. 3.

The motor cover or housing 120 is then lowered still further into the cavity 80 which causes the peripheral edge of the respective side walls 122 and 124 of the cover 120 to come into contact with the sloped exterior surfaces of the respective tabs 96 and 100 on the side walls 82 and 84 of the pedal 12 which initially causes the inward flexing or movement of the respective side walls 122 and 124 of the cover 120 followed by the outward flexing or movement of the respective side walls 122 and 124 of the cover 120 following the further downward movement of the cover 120 into the relationship as at in FIG. 9 wherein the tab 96 on the side wall 82 of the pedal 12 extends and is located and snapped into the aperture 125 in the side wall 122 of the motor cover or housing 120 and the tab 100 on the opposed side wall 124 of the pedal 12 extends and is located and snapped into the aperture 130 defined in the opposed side wall 124 of the motor cover or housing 120 thereby providing a snap lock of the motor cover or housing 130 to the pedal 12.

The snap lock of the motor cover or housing 130 to the pedal 12 in the relationship wherein the cover longitudinal side walls 122 and 124 are abutted against the interior surface of the respective pedal longitudinal side walls 82 and 84 advantageously provides a seal that protects the elements of the vibration generation assembly 70 located in the pedal cavity 80.

The snap lock of the motor cover or housing 130 to the pedal 12 also advantageously provides a tamper proof securement of the vibration generation assembly 70 to the pedal 12 in view that once the motor cover or housing 130 has been secured and sealed with the pedal 12, the interior snaps or tabs 96 and 100 are not accessible and thus the motor cover or housing 130 cannot be removed or tampered with without also causing damage to the cover 130 and the snaps 96 and 100.

The fitting of the longitudinal side walls 122 and 124 of the cover 120 between and in contact with the longitudinal side walls 82 and 84 on the underside of the pedal 12 also advantageously causes the side walls 122 and 124 of the cover 120 and more specifically the interior ribs 171 and 173 thereof to remain in contact with the exterior surface of the motor 72 also for the purpose of allowing improved vibration transmission and transfer from the motor 72 and eccentric 102 to the pedal 12.

Moreover, and as shown in FIGS. 7, 8, 9, and 10, in the coupled and integrated relationship of the vibration generation assembly 70 and motor cover or housing 120 to the pedal 12, the motor cover or housing 130 is located in the portion of the pedal arm cavity 80 bounded by the transverse side walls 85 and 86 in the underside of the pedal 12 and the terminal assembly cover or housing 120 is located in the portion of the pedal arm cavity 80 bounded by the transverse side walls 86 and 87 in the underside of the pedal 12 with the interior partial wall 94 located and extending between the two terminals 142 and 144 to prevent contact between the two terminals 142 and 144, and the interior partial wall 88 extending into the slit or slot 160 defined in the terminal bracket 146 for mounting and preventing movement of the terminal bracket 146 in the interior cavity 80 of the pedal 12.

Moreover and referring to FIG. 10, in the coupled and integrated relationship of the vibration generation assembly 70 with the pedal 12, the terminal and bracket assembly 140 is integrated in the pedal 12 in a relationship wherein the terminals 142 and 144 are located in the recess 92 defined in the transverse wall 86 with the partial wall 94 extending between the two terminals 142 and 144; the terminal segments 152 are seated against the interior surface 47 of the pedal 12; the cable terminal ends 148a and 148b extend through the recess 92 defined in the transverse wall 86; and the combination terminal and cable bracket 146 is located in the cavity 80 with the wall 88 extending into the slit 160 in the bracket 146.

Figure 11:
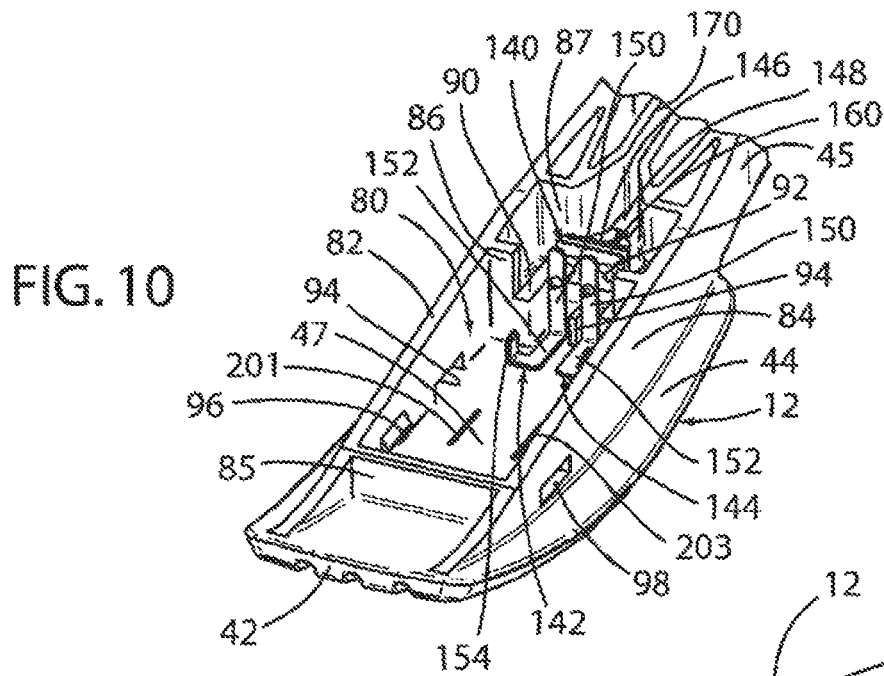
FIG. 11 is a broken, vertical cross-sectional view of one of the interior cable snap recesses defined in the coring material of the pedal arm taken along the line 11-11 in FIG. 3.

As shown in FIGS. 1, 3, 7, 8, 9, 10, 11, 12, and 13, the elongate power cable 148 extends in and through an elongate centrally located interference slit or slot 170 that extends the length of the underside of the pedal 12 and more specifically the length of the underside of the pedal arm 45 between the cavity wall 87 and the proximal end of the pedal arm 45 adjacent the drum 48 of the pedal 12 and in a relationship generally co-linear with the longitudinal axis of the pedal 12. Specifically, the elongate slit or slot 170 is defined and formed and extends through a gap that is defined and formed in the plastic coring material that defines and forms the pedal arm 45 and the pedal 12. Moreover, and as shown in FIG. 11, the material of the pedal coring defining the elongate slit or slot 170 also forms and defines a plurality of additional interior cable retention recesses or slots or snaps 172 (FIGS. 11-13) which are located in the slot 170 and extend in a direction generally normal to the slit or slot 170.

In the embodiment shown, four such cable retention recesses or slots or snaps 172 are defined in the coring of the pedal 12 at the four spaced-apart and co-linear locations along the longitudinal axis of the pedal arm 45 as depicted in FIG. 3. Moreover, in the embodiment shown, the three cable retention recesses or slots 172 shown in FIG. 12, and located in the pedal 12 at the longitudinal locations indicated in FIG. 3, are all located at the same vertical level in the interior of the pedal 12 while the one cable retention recess or slot 172 shown in FIG. 13, and located in the pedal 12 at the longitudinal location as indicated in FIG. 3 adjacent the drum 48, is located in the interior of the pedal 12 at a different vertical level than the other three cable retention recesses or slots 172 which is closer to the exterior surface of the pedal arm 45 to facilitate the egress of the cable 148 from the pedal 12 at the end 46 of the pedal 12.

During the assembly of the pedal assembly 10 during the manufacturing process, the length of the power cable 148 is pushed inwardly and interference fitted into the interior of the slit or slot 170 defined in the underside of the pedal arm 45 and into the relationship as shown in FIG. 11 wherein the cable 148 extends longitudinally through the longitudinally extending slit or slot 170 and is wedged into and secured in each of the respective cable retention recesses or slots or snaps 172 also extending in the slot 170 to prevent the power cable 148 from exiting the slit or slot 170 and the pedal arm 45 during use.

Figure 12:
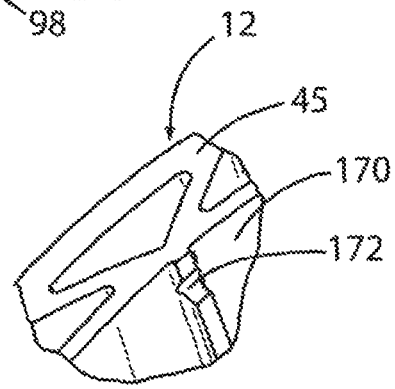
FIG. 12 is an enlarged, broken, perspective view of the interior cable snap recess shown in FIG. 11 and FIG. 3 indicates the location of these cable snap recesses in the pedal arm.
Figure 13:
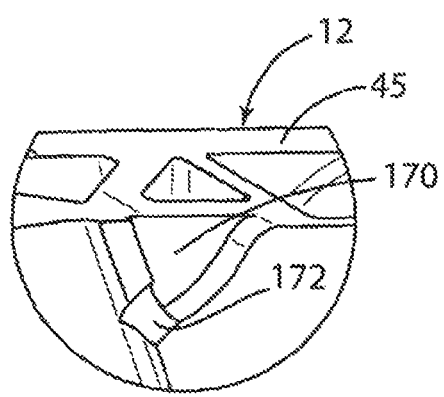
FIG. 13 is an enlarged, broken, perspective view of another one of the interior cable snap recesses of FIG. 11 and FIG. 3 indicates the location of this cable snap recess in the pedal arm.

As shown in FIGS. 12 and 13, the material of the coring of the pedal arm 45 includes and defines internal cable guide ramps 180 and 182 in the region of the slit or slot 170 located adjacent the proximal end and drum 48 of the pedal 12 which guide the cable 148 out of the pedal arm 45 in the region of the proximal end and drum 48 of the pedal 12.

During the operation of the pedal assembly 10, the activation of the motor 72 in response to the detection and sensing of a particular vehicle condition or event causes the activation and rotation of the motor shaft 104 which in turn causes the rotation of the eccentric 102 in the interior cavity 80 of the pedal 12 which in turn and by virtue of the unevenly distributed mass on the eccentric 102 generates and causes the transfer of a vibratory force to the pedal 12 and more specifically causes the generation and transfer of a vibratory force or vibration to the pedal plate 44 which in turn is transferred to the foot of the operator so as to allow the transfer of a vibratory sensory signal to the operator of the occurrence of a vehicular event or condition requiring the operator's attention including for example the occurrence of a vehicular event or condition requiring the operator to remove his or her foot from the pedal 12 of the pedal assembly 10 so as to cause a deceleration of the vehicle.

The motor 72 has a voltage dependent and variable speed which in turn results in an eccentric 102 adapted for voltage variable speed rotation which in turn results in a voltage variable pedal vibration intensity and frequency.

In one embodiment, the motor 72 may be coupled to a motor controller box (not shown) adapted to allow for the storage of a plurality of combinations of vehicle event parameters and which may be adapted to draw its power from any suitable power source including for example the vehicle cigarette lighter outlet and is adapted to allow for the adjustment of motor supply voltage, duty cycle percentage, duty cycle frequency, and momentary or constant power to the motor 72.

FIGS. 14 and 15 depict a second embodiment of a pedal 212 in accordance with the present invention which is identical in all respects to the pedal assembly 10 with the exception that the cable retention slit or slot 170 defined in the coring material on the underside of the pedal 12 of the pedal assembly 10 has been substituted and replaced with a pro-formed and pre-shaped cable retention bar or tube or conduit 290 that has been insert molded into the coring material of the pedal 12 and more specifically that has been insert molded into the coring material on the underside of the pedal arm 45 during the molding of the pedal 12. As shown in FIG. 14, the cable retention tube or conduit 290 extends through the pedal arm 45 between the foot plate 44 and the drum 48 of the pedal 12. As shown in FIG. 15, the cable retention tube or conduit 290 has the same general shape and configuration as the shape and configuration of the pedal arm 45.

During assembly of the pedal assembly 10, and more specifically following the coupling of the motor assembly 70 to the pedal 212, the cable 148 is fed through the cable retention tube or conduit 290 thereby securing the cable 148 in the interior of the arm 45 of the pedal 212.

The tube or conduit 290 advantageously protects the cable 148 from damage from external objects and wear due to change in tension of the cable 148. The tube or conduit 290 is also a structural part and component of the molded pedal 212 thus increasing the overall strength and load which can be applied to the pedal 212.

All of the other elements of the pedal 212 are identical in structure and function to the elements of the pedal assembly 10 and thus such elements have been identified in FIG. 14 with the same reference numerals as used for such elements in FIGS. 1-10 and thus the earlier description of the structure and function of such elements with respect to the pedal assembly 10 is incorporated and applied herein by reference with regard to the pedal assembly 200.

Numerous variations and modifications of the embodiments described above may be effected without departing from the spirit and scope of the novel features of the invention. It is to be understood that no limitations with respect to the specific active vibratory pedal assembly illustrated herein are intended or should be inferred. It is, of course, intended to cover by the appended claims all such modifications as fall within the scope of the claims.

We claim:

1. An active vibratory vehicle pedal assembly comprising:
a pedal housing;
a rotatable pedal including a distal end extending into and rotatable relative to the pedal housing and a proximal end with a foot plate, the pedal including an underside defining a cavity located under the foot plate;
a vibration generation assembly located and mounted in the cavity of the pedal, the vibration generation assembly including an electric motor and an eccentric coupled to the motor, the eccentric being adapted for rotation relative to the motor and generate a vibration that is transferred to the foot plate; and
a terminal and cable assembly located and mounted in the cavity defined in the underside of the pedal and including a pair of terminals, a combination terminal and cable bracket,and an elongate cable extending from the cable bracket, the pair of terminals being adapted for coupling to the motor, the combination terminal and cable bracket being mounted in the cavity defined in the underside of the pedal, and the cable extending through an elongate slot defined in the underside of the pedal and extending between the proximal and distal ends of the pedal.

2. An active vibratory pedal assembly comprising:
a pedal housing;
a pedal including a first end extending into the pedal housing and rotatable relative to the pedal housing, the pedal including a second end including a foot plate and an underside including a plurality of walls defining a cavity under the foot plate;
a vibration generation assembly mounted in the cavity under the foot plate and including an electric motor and an eccentric coupled to the motor for rotation relative to the motor and adapted to generate a vibration that is transferred to the foot plate;
a motor terminal and cable assembly including a pair of terminals coupled to the motor and extending into the cavity defined in the underside of the pedal, a combination terminal and cable bracket mounted in the cavity defined in the underside of the pedal, and an elongate cable extending from the combination terminal and cable bracket into an elongate slot defined in the underside of the pedal; and
a cover including a plurality of walls coupled to the plurality of walls respectively on the underside of the pedal and covering the electric motor, the eccentric, the pair of terminals, and the combination terminal and cable bracket.

3. The active vibratory pedal assembly of claim 2 wherein the combination terminal and cable bracket defines a slot and the pedal includes a partial wall located in the cavity defined in the underside of the pedal, the partial wall extending into the slot in the combination terminal and cable bracket for mounting the combination terminal and cable bracket to the pedal.

4. The active vibratory pedal assembly of claim 2 wherein the plurality of walls of the cover include an internal rib in contact with the motor and adapted to allow the transfer of the vibration generated by the eccentric to the pedal through the walls of the cover and the walls of the pedal.

5. The active vibratory pedal assembly of claim 2 wherein one of the walls of the cover or the pedal includes a tab and the other of the walls of the cover or the pedal includes an aperture, the tab extending into the aperture for snap fitting the cover to the pedal.

6. The active vibratory pedal assembly of claim 2 wherein a recess is defined in the underside of the pedal, the recess being located in the elongate slot and the cable being retained in the recess in the slot.

* * * * *